Feb. 9, 1954 E. W. TILLIS 2,668,462
PISTON RECONDITIONING DEVICE
Filed Jan. 28, 1952 2 Sheets-Sheet 1
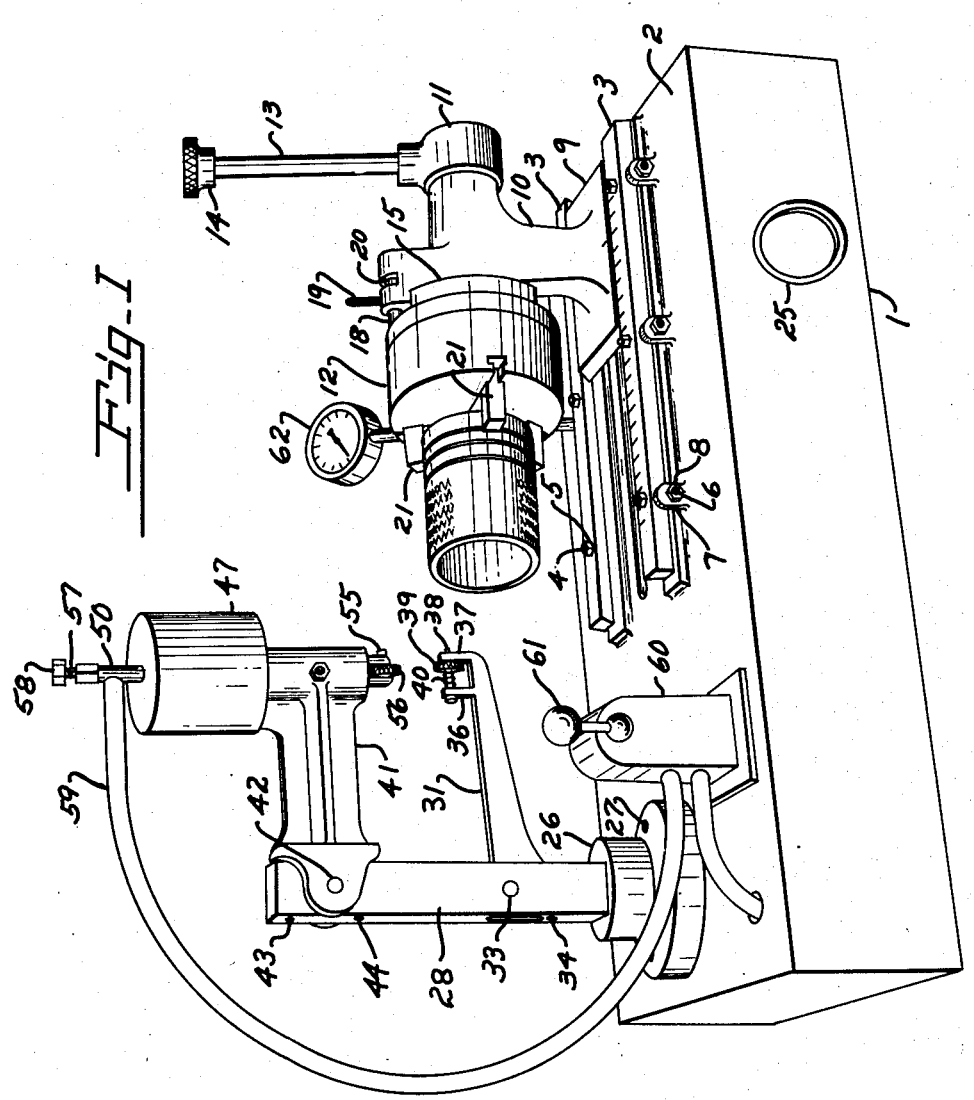
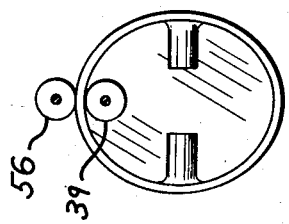
INVENTOR.
EARL W. TILLIS
BY
Marshall jr Marshall
ATTORNEYS Feb. 9, 1954  E. W. TILLIS  2,668,462
PISTON RECONDITIONING DEVICE
Filed Jan. 28, 1952  2 Sheets-Sheet 2
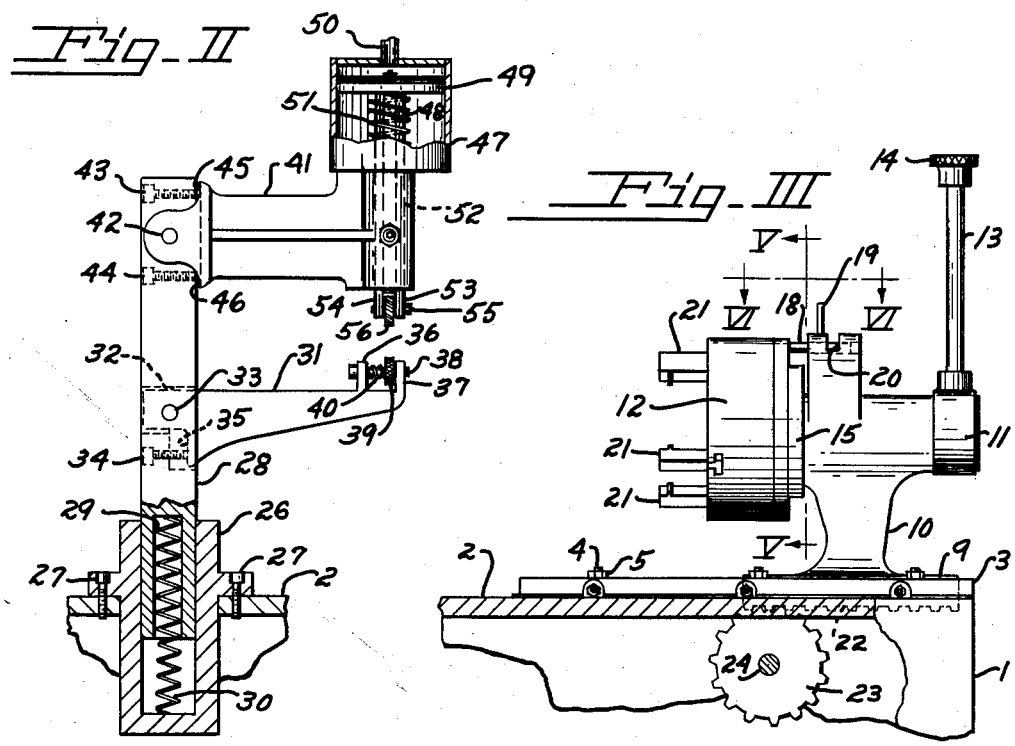
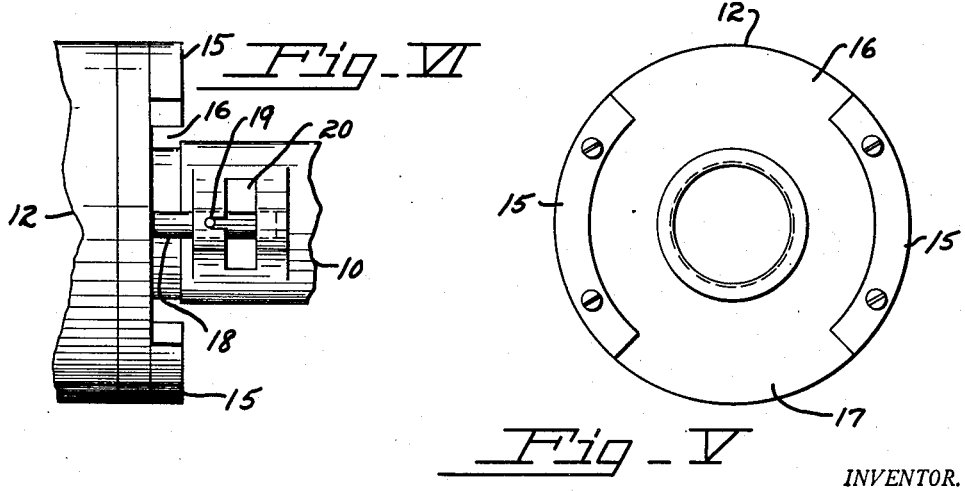
INVENTOR.
EARL W. TILLIS
BY
Marshall & Marshall
ATTORNEYS Patented Feb. 9, 1954

2,668,462

UNITED STATES PATENT OFFICE 2,668,462

PISTON RECONDITIONING DEVICE

Earl W. Tillis, Elkhart, Ind.

Application January 28, 1952, Serial No. 268,624

8 Claims. (Cl. 80—5.1)

This invention relates to automobile servicing equipment and particularly to devices for reconditioning automobile engine pistons.

An automobile engine piston comprises a circular body having a closed flat or concave top and a skirt which depends from the circular body. The circular body is made slightly smaller in diameter than the bore of the cylinder within which it is to reciprocate, so that it will not seize or bind in the cylinder even when it is expanded by heat, and it is provided with peripheral grooves which receive split piston rings that expand resiliently to conform closely to the cylinder wall.

The piston is connected to the engine crank shaft by means of a connecting rod having its lower end journaled on a crank pin and its upper end pivoted to the piston body by means of a wrist pin. As the piston reciprocates up and down and the connecting rod pivots from side to side on the wrist pin the piston is prevented from rocking or tilting within the cylinder by the piston rings which guide the upper end of the piston and the skirt which guides the piston's lower end. The skirt therefore is made to fit closely against the right and left sides of the cylinder bore, though it need not fit closely against the front or back. This close fit against the sides is sometimes accomplished by making the skirt slightly oval.

The side thrust created by the pressure of the products of combustion against the angularly positioned connecting rod, and by the inertia of the piston itself as it accelerates and decelerates, causes wear of the engaging surfaces. The piston skirt may be sufficiently resilient to take up some wear, but the necessity for avoiding excessive friction when the engine is new limits the degree of resilient expansion for which the skirt may properly be designed.

Eventually the sides of the skirt wear down, the skirt becomes loose and so called "piston slap" makes the engine noisy and inefficient.

It is an object of this invention to provide improved means for restoring the lateral dimensions of piston skirts which have been reduced by wear.

More specifically it is an object of this invention to provide improved means for creating protuberances on the surfaces of piston skirts that have been worn down.

A further object is to provide improved means for grouping such protuberances in bands extending partially around the piston skirts at the locations of greatest wear.

A further object is to provide a device capable of forming such bands on piston skirts of various sizes and having various interior contours and various hardness characteristics, and another object is to provide means for raising the protuberances of such bands to substantially equal heights in all areas of the bands.

Another object is to provide a machine having a rugated roller and fluid pressure means to force said rugated roller against the exterior of a piston skirt, a backing roller adapted to engage the interior of a piston skirt and means for so mounting said rugated roller and said backing roller that such fluid pressure will move said backing roller into backing engagement with such piston skirt.

Another object is to so construct the means for mounting said rugated knurling roller and said backing roller that such fluid pressure will be effective to bring them into proper engagement with piston skirts of various sizes and will permit them to remain in pinching engagement with such skirt even though the exterior of such skirt be noncircular and/or eccentric and the contour of the interior of such piston skirt be irregular.

Other objects and advantages will be apparent from the following detailed description as illustrated by the accompanying drawings in which:

Figure I is a view in perspective of a machine embodying the instant invention.

Figure II is an elevational view, partly in section, of knurling mechanism showing a fragment of the base of the machine on which the knurling mechanism is mounted.

Figure III is an elevational view of piston holding mechanism with a part of the base of the machine shown in section to depict the manner in which the piston holding mechanism is mounted thereon.

Figure IV is an end elevation of a piston showing the oval shape of the skirt as somewhat exaggerated and showing the skirt as pinched between rollers.

Figure V is an enlarged end elevational view of the piston holding element of the machine showing arcuate stops to limit the rocking movement of the element.

Figure VI is a fragmentary front elevational view of the element illustrated in Figure V showing it mounted in juxtaposition to a pin positioned to engage the arcuate stops.

The base 1 of the machine is shown as hollow and rectangular, having a substantially flat top 2 upon which a pair of ways 3 is secured by means of studs 4 and nuts 5. The ways 3 may be adjusted into parallelism and further adjusted when necessary to compensate for wear by means of screws 6 which are threaded through lugs 7 projecting upwardly from the top 2, the screws 6 being held against accidental turning by means of lock nuts 8. This adjustment of ways 3 is permitted by the well known expedient of making the dimensions of the holes in ways 3 through which the studs 4 project slightly larger than the dimensions of the studs in the direction in which adjustment is to be made.

Mounted for free sliding movement between the ways 3 is a plate 9 upon which is erected a stand 10, and journaled in the stand is a rock shaft (not shown) having a collar 11 fixed upon one of its ends and a piston holding element in the form of a chuck 12 fixed upon its other end. Extending from the collar 11 is a handle 13 that is provided with a knob 14 by means of which the rock shaft and the parts carried thereby may be rocked. The chuck 12 has fixed thereto a pair of arcuate stops 15, the ends of which are angularly spaced as at 16 and 17, and projecting into the space 16 is a pin 18 that is slidably mounted on the stand 10. A finger piece 19 is fixed to the pin 18 and extends outwardly through an opening 20 to facilitate manipulation of the pin 18.

The chuck 12 is provided with gripping elements 21 which are moved radially and in unison by well known chuck mechanism (not shown) to grip the body of the piston in the manner illustrated in Figure I.

The plate 9 is provided with a rack 22 which meshes with a pinion 23 that is fixed upon a shaft 24 which may be turned by means of a hand wheel 25 located on the front side of the base 1.

A socket 26 is sunk into the top 2 adjacent its left end and fixed in position by means of screws 27. The opening in the socket 26 is rectilinear in cross section, and slidably fitting in the socket is a post 28 which is also rectilinear in cross section. The post 28 has a bore 29, in its bottom, which receives an expansive spring 30 that reacts against the bottom of the socket 26 with sufficient force to lift the post 28 and the parts carried thereby into the position in which they are shown in Figures I and II. The strength of the spring 30 is such, however, that the post 28 can readily be pushed downwardly by hand to the bottom of the socket.

A bracket 31 has one end held within a slot 32 in the post 28 by a pintle 33, and a set screw 34 threaded in the post 28 for engaging a shoulder 35 on the bracket 31 serves to adjust the bracket angularly about the pintle 33.

Extending between ears 36 and 37 is an axle 38 which carries a backing roller 39, the backing roller 39 being capable of shifting longitudinally of the axle 38 but ordinarily being held in the position in which it is shown in Figures I and II by an expansive spring 40.

The arm 41 is attached to the upper end of the post 28 by a pintle 42 and is angularly adjustable upon the pintle by means of set screws 43 and 44 which are threaded in the post 28 for engaging shoulders 45 and 46 on the arm 41. Fixed upon the arm 41 is a cylindrical chamber 47 within which reciprocates a plunger 48 with a circular piston 49 fastened upon its upper end. Fluid, such as air, admitted under pressure through a fitting 50 into the upper end of the cylindrical chamber 47 forces the plunger down, while an expansive spring 51 serves to lift the plunger when the fluid pressure is relieved.

The plunger 48 extends downwardly through a vertical bore 52 in the arm 41 and has a pair of ears 53 and 54 formed upon its lower end. Extending between the ears 53 and 54 is an axle 55 which carries a rugated knurling roller 56. By manipulating the set screws 34, 43 and 44 the axes about which the backing roller 39 and knurling roller 56 turn may be adjusted into parallelism or into various angular relationships with each other and with the axis about which the piston holder 12 is rocked by means of the handle 13 with its knob 14. The knurling done by the knurling roller thus may be made uniform.

The fitting 50 may be provided with a valve, the stem 57 of which is equipped with a hexagonal head 58. A flexible hose 59 is attached to the fitting 50 and extends therefrom to a presure control unit 60 having a handle 61 by means of which air or other fluid may be admitted to or released from the cylindrical chamber 42 to provide any desired pressure. The control unit may be of any suitable construction and will not be described in detail herein. The machine may be equipped with a pressure gauge 62 to indicate the fluid pressure available for the machine's operation.

Operation

When it is desired to process a piston the piston is clamped in the jaws 21 of the piston holder 12 with the wrist pin sockets horizontal and the handle 13 extending vertically. The hand wheel 25 then is turned to move the piston skirt to a position surrounding the backing wheel 39, the post 28 being pushed downwardly sufficiently to permit the piston skirt to move over the backing wheel. The handle 61 of the pressure control unit 60 is manipulated to admit pressure to the cylindrical chamber 47. The pressure pushes the plunger 48 downwardly until the roller 56 engages the piston skirt. Since the upward pressure on the cylindrical chamber 47 is equal to the downward pressure on the plunger, the backing roller 39 is pulled upwardly with a force equal to the downward force exerted on the knurling roller 56. Thus the piston skirt is squeezed between the backing roller and the knurling roller, but there is no tendency to push the piston skirt bodily downward. As the knurling roller 56 is forced against the theretofore smooth surface of the piston skirt, its rugations sink into the smooth surface and cause the material of the piston skirt to flow upwardly into the interstices between the rugations on the knurling roller. The operator then rocks the piston to and fro, thus forming a series of protuberances, which may be knolls or ridges, the pattern of which is in conformity with the pattern of the rugations on the knurling roller.

Since the post 28 "floats" in its socket, the rollers can move together bodily to conform to noncircularity or eccentricity of the piston skirt, and since the rollers can be forced away from each other against the fluid pressure, the backing roller 39 can ride over ribs or other thickened portions of the piston skirt.

By releasing the pressure and turning the knob 25 to advance the piston holder to new positions, additional bands of protuberances may be raised upon the surface of the skirt. When the piston has been knurled on one side, the pin 18 may be retracted by means of the finger piece 19, the piston holder turned through 180° and the processing repeated on the opposite side of the piston skirt.

Having described the invention, I claim:

1. In a piston reconditioning device, in combination, a base, an upright post mounted on said base for free vertical movement, a knurling roller and a backing roller located one above the other and both carried by said posts, means mounted on said base for supporting a piston with a portion of its skirt extending between said knurling roller and said backing roller, and pneumatic means for causing said knurling roller and said backing roller to squeeze the portion of such skirt that extends between said knurling roller and said backing roller.

2. In a piston reconditioning device, in combination, a base, an upright post mounted upon said base for free vertical movement, means for preventing said upright post from turning about its vertical axis, a knurling roller and a backing roller located one above the other and both carried by said post, means mounted on said base for supporting a piston with a portion of its skirt extending between said knurling roller and said backing roller, and pneumatic means for causing said knurling roller and said backing roller to squeeze the portion of such skirt that extends between said knurling roller and said backing roller.

3. In a piston reconditioning device, in combination, a base having a socket therein an upright post mounted in said socket for free vertical movement, means for preventing said post from turning in said socket, a knurling roller and a backing roller located one above the other and both carried by said post, means mounted on said base for supporting a piston with a portion of its skirt extending between said knurling roller and said backing roller, and pneumatic means for causing said knurling roller and said backing roller to squeeze the portion of such skirt that extends between said knurling roller and said backing roller.

4. In a piston reconditioning device, in combination, a base having a rectangular socket therein, a rectangular post mounted in said socket for free vertical movement, a knurling roller and a backing roller located one above the other and both carried by said post, means mounted on said base for supporting a piston with a portion of its skirt extending between said knurling roller and said backing roller, and pneumatic means for causing said knurling roller and said backing roller to squeeze the portion of such skirt that extends between said knurling roller and said backing roller.

5. In a piston reconditioning device, in combination, a base, an upright post mounted on said base for free vertical movement, resilient means for substantially counterbalancing the weight of said post and the parts supported thereby, a knurling roller and a backing roller located one above the other and both carried by said post, means mounted on said base for supporting a piston with a portion of its skirt extending between said knurling roller and said backing roller, and pneumatic means for causing said knurling roller and said backing roller to squeeze the portion of such skirt that extends between said knurling roller and said backing roller.

6. In a piston reconditioning device, in combination, a base having a socket therein, an upright post mounted in said socket for free vertical movement, means for preventing said post from turning in said socket, a helical spring engaging said post and extending into said socket and substantially counterbalancing the weight of said post and the parts supported thereby, a knurling roller and a backing roller located one above the other and both carried by said post, means mounted on said base for supporting a piston with a portion of its skirt extending between said knurling roller and said backing roller, and pneumatic means for causing said knurling roller and said backing roller to squeeze the portion of such skirt that extends between said knurling roller and said backing roller.

7. In a piston reconditioning device, in combination, a base, an upright post mounted on said base for free vertical movement, a bracket mounted on said post, a backing roller mounted on said bracket, an arm projecting from said post, a knurling roller mounted on said arm, means mounted on said base for supporting a piston with a portion of its skirt extending between said backing roller and said knurling roller, and pneumatic means for forcing said knurling roller and said backing roller toward each other to squeeze the portion of such skirt that extends between said knurling roller and said backing roller.

8. In a piston reconditioning device, in combination, a base, an upright post mounted on said base for free vertical movement, a bracket mounted on said post, a backing roller mounted on said bracket, an arm projecting from said post, a plunger mounted on said arm for up and down movement a knurling roller mounted on the lower end of said plunger, a pneumatic pressure device acting upon the upper end of said plunger to force said knurling roller toward said backing roller, and means mounted on said base for supporting a piston with a portion of its skirt extending between said knurling roller and said backing roller.

EARL W. TILLIS.

References Cited in the file of this patent
UNITED STATES PATENTS

| Number | Name | Date |
|---|---|---|
| 2,593,887 | Jones | Apr. 22, 1952 |